United States Patent
Burke (10) Patent No.: US 9,287,693 B2
(45) Date of Patent: Mar. 15, 2016

(54) ENHANCED STRENGTH GRADE LEVEL UTILITIES ENCLOSURE

(71) Applicant: Channell Commercial Corporation, Temecula, CA (US)

(72) Inventor: Edward J. Burke, Temecula, CA (US)

(73) Assignee: Channell Commercial Corporation, Temecula, CA (US)

( * ) Notice: Subject to any disclaimer, the term of this patent is extended or adjusted under 35 U.S.C. 154(b) by 14 days.

(21) Appl. No.: 13/830,670

(22) Filed: Mar. 14, 2013

(65) Prior Publication Data

US 2014/0117018 A1    May 1, 2014

Related U.S. Application Data

(60) Provisional application No. 61/720,297, filed on Oct. 30, 2012.

(51) Int. Cl.
| | |
|---|---|
| B65D 88/76 | (2006.01) |
| H02G 9/10 | (2006.01) |
| H02G 3/18 | (2006.01) |
| G02B 6/44 | (2006.01) |

(52) U.S. Cl.
CPC ............ H02G 9/10 (2013.01); G02B 6/4451 (2013.01); H02G 3/185 (2013.01); G02B 6/4444 (2013.01)

(58) Field of Classification Search
CPC ........ H02G 9/10; G02B 6/4451; E02D 29/12; E02D 29/14
USPC ........ 220/484, 4.28, 618, 693, 477, 661, 676, 220/3.2, 3.3, 3.4, 3.5; 174/38, 37; 52/19, 52/169.6–167.9
See application file for complete search history.

(56) References Cited

U.S. PATENT DOCUMENTS

| | | | | |
|---|---|---|---|---|
| 2,988,020 | A | * | 6/1961 | Stough .......................... 410/152 |
| 3,826,207 | A | * | 7/1974 | Sutherlan ...................... 108/108 |
| 4,005,253 | A | * | 1/1977 | Walter ............................ 174/37 |

(Continued)

FOREIGN PATENT DOCUMENTS

WO    WO 2006/096839 A1    9/2006

OTHER PUBLICATIONS

Society of Cable Telecommunications Engineers, Specification for Underground Enclosure Integrity, ANSI/SCTE 77 2010, 18 pages.

(Continued)

*Primary Examiner* — Anthony Stashick
*Assistant Examiner* — James M Van Buskirk
(74) *Attorney, Agent, or Firm* — Lewis Roca Rothgerber Christie LLP (57) ABSTRACT

An enhanced strength grade level utility enclosure comprises a vertical wall structure having an upright inner wall panel extending from an upper edge to a bottom edge of the structure. The inner wall panel has an inside face spanning the enclosure's interior. One or more narrow, vertically extending slotted regions are recessed in the inside face of the wall panel. Upright rigid support bars, optionally adapted for use as cable racks, are positioned in and rigidly affixed to separate slotted regions on the wall panel. The support bars provide a continuous means of rigid vertical support from the upper edge down to the bottom edge of the enclosure's wall structure. The recessed support bars, in combination with the vertical wall structure, provide enhanced wall strength in excess of industrial vertical side wall and center load test standards.

20 Claims, 10 Drawing Sheets

(56) References Cited

U.S. PATENT DOCUMENTS

| | | | |
|---|---|---|---|
| 4,158,102 A | 6/1979 | Bright | |
| 5,791,098 A | 8/1998 | Thomas | |
| 6,393,776 B1 * | 5/2002 | Waller et al. | 52/169.6 |
| 6,662,520 B1 * | 12/2003 | Nelson | 52/474 |
| 6,901,710 B1 | 6/2005 | Cooper | |
| 7,381,888 B2 | 6/2008 | Burke et al. | |
| 7,385,137 B2 * | 6/2008 | Burke et al. | 174/50 |
| 7,475,515 B2 | 1/2009 | Machledt et al. | |
| 8,249,411 B2 * | 8/2012 | Burke | 385/135 |
| 2010/0206019 A1 | 8/2010 | Burke et al. | |
| 2011/0262094 A1 | 10/2011 | Burke | |
| 2012/0104110 A1 * | 5/2012 | Roberts, Jr. | 238/84 |

OTHER PUBLICATIONS

International Search Report and Written Opinion for PCT/US2013/067148, mailed on Jan. 22, 2014, 11 pages.

* cited by examiner

ENHANCED STRENGTH GRADE LEVEL UTILITIES ENCLOSURE

CROSS-REFERENCE

This application claims the benefit to and priority of U.S. Provisional Application No. 61/720,297, filed Oct. 30, 2012, incorporated herein in its entirety by this reference.

FIELD OF THE INVENTION

This invention relates to enclosures for underground utility lines, and more particularly, to an underground utility enclosure having improved load capacity.

BACKGROUND

Underground utility equipment enclosures include the so-called grade level vaults, splice boxes, pull boxes, and the like, for various applications requiring access to an underground service. These may include electrical, gas, water, telephone, fiber optics and cable TV installations, for example.

Grade level enclosures are commonly subjected to different kinds of structural loads during use. Generally speaking, prior art enclosures and their cover plates are made from reinforced concrete, fiberglass, or polymer concrete composite materials for added load strength, to withstand the compression forces during use.

Grade level enclosures, particularly those used for telecommunications equipment, are adapted to facilitate use with different types of internal equipment. They may include splice cases, fiber optic cables, electrical wires, and the like, supported in the enclosure by metal cable racks fastened to upper portions of the enclosure's inside walls.

Industry standards have been developed for conformance tests and requirements for the structural integrity of such grade level enclosures. One standard commonly used for underground enclosures is known as ANSI/SCTE 77-2010. This set of standards for underground enclosure integrity has Tier designations that relate to various load ratings to ensure proper performance for different types of underground enclosures. The objective of these standards is to ensure long product service life, minimized maintenance, and reduced product liability for those who design, develop, and market them.

In one example, the ANSI Tier designations relate to the normal design load×1000 lbs. For instance, Tier 15=15×1000 lbs=15,000 lbs. These ANSI Tier loadings have a corresponding test load which is 50% greater than the design load. For example, the test load for Tier 15=15,000 lbs×1.5=22,500 lbs. (Tier 15 [15,000 lb. design load, 22,500 lb. test load] is applicable to driveways, parking lots and off-road applications subject to occasional non-deliberate heavy vehicular traffic.)

The ANSI/SCTE 77-2010 performance specification includes a three-position structural test simulating wheels rolling over an enclosure where loads are imparted laterally and vertically onto the side wall of the enclosure and vertically onto its cover. The related structural integrity tests comprise:

(1). Position one—a lateral side wall test—a test of the area that must withstand soil forces as vehicles approach.

(2). Position two—a vertical side wall test—a test of load applied directly downward onto the vertical side wall.

(3). Position three—a cover test—a test showing how an enclosure responds to a load applied directly to the center of the cover.

The present invention provides an enhanced strength grade level utilities enclosure that can be made from lighter weight polymeric materials. In one embodiment, the enclosure's design provides enhanced structural loading capacity in excess of ANSI Tier 15 vertical side wall load and center cover vertical load requirements.

The ANSI Tier 15 test standards are one example of various industry test standards for grade level enclosures for which the present invention provides enhanced load capacities. Structural improvements, in particular, are demonstrated for enclosures' vertical side wall load capacities; and these improvements would result for different types of enclosures each having their own separate vertical side wall load capacity requirements.

SUMMARY OF THE INVENTION

Briefly, one embodiment of this invention comprises an enhanced strength grade level utility enclosure which includes a vertical wall structure made of a molded polymeric material. The vertical wall structure has an upright inner wall extending from the upper edge to the bottom of the vertical wall structure. The inner wall faces the interior of the enclosure. One or more narrow, vertically extending slotted regions are recessed in the inside face of the inner wall. Upright rigid support bars, adapted for use as cable racks, are positioned in separate slotted regions formed on the inside face of the wall structure. The support bars provide a substantially continuous means of rigid vertical load support extending from the upper edge down to the bottom edge of the enclosure's vertical wall structure. The recessed support bars in combination with the vertical wall structure provide enhanced wall load strength sufficient for exceeding vertical side wall load test standards, among other test standards, for grade level enclosures.

These and other aspects of the invention will be more fully understood by referring to the following detailed description and the accompanying drawings.

DETAILED DESCRIPTION

Figure 1:
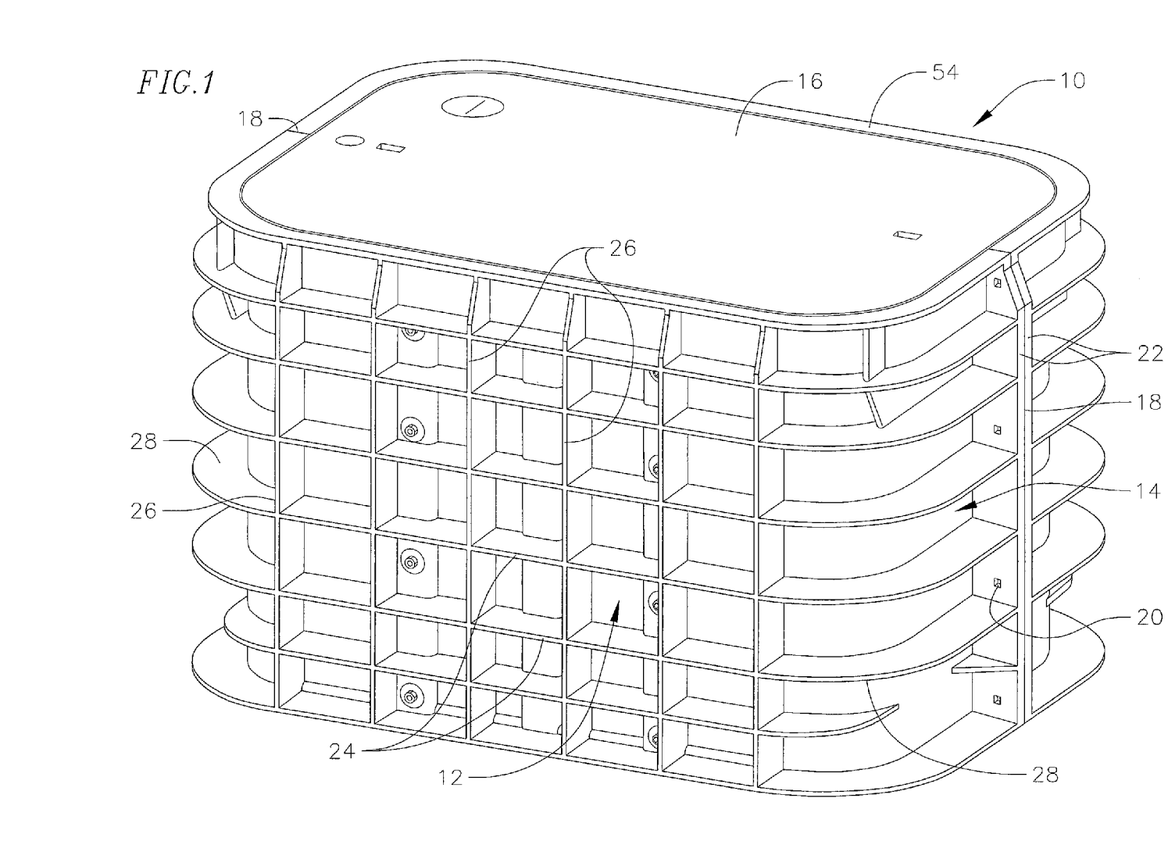
FIG. 1 is a perspective view showing one embodiment of an enhanced strength grade level utilities enclosure according to principles of this invention.

FIG. 1 illustrates one embodiment of a grade level underground utilities enclosure 10 according to principles of this invention. The enclosure includes a pair of long parallel side walls 12 and a pair of shorter endwalls 14 forming a generally rectangular structure having a hollow interior. The grade level enclosure has an open bottom. An open top of the enclosure receives a flat top cover plate or panel 16. The enclosure is made of hard molded plastic such as high density polyethylene and is molded in halves, split along its longitudinal center axis into two parts, forming a seam 18 at each end. The two halves are rigidly fastened together along the seams at each end by fasteners at 20 extending through upright flanges 22 which face each other along each seam. The enclosure also has a molded integrally formed grid structure facing outwardly along each side wall. The configuration of the grid structure can be in various forms. The illustrated grid structure has an I-beam configuration formed by long horizontal flanges 24 and vertical upright flanges 26, forming an essentially rectangular array. The horizontal flanges wrap around the ends of the enclosure at 28. This construction of the enclosure provides good compressive strength to resist vertical loads on the side walls of the enclosure. Other configurations can include diagonally extending or diamond pattern molded flanges, for example.

Figure 1A:
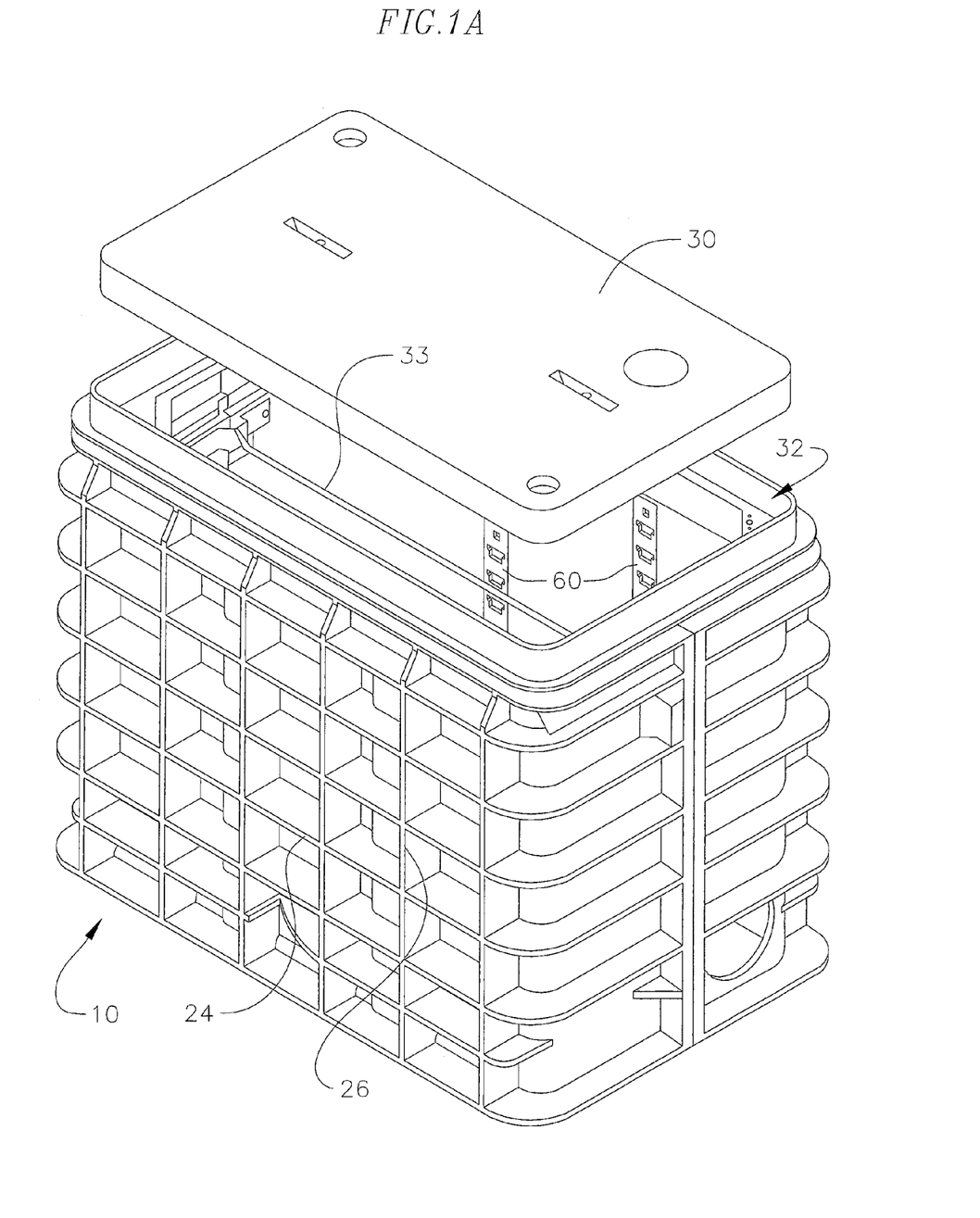
FIG. 1A is a perspective view showing another embodiment of the utilities enclosure.

The Appendix to the present application shows features, including dimensions, of one embodiment of the enclosure. FIG. 1A shows the same embodiment, with a top cover plate 30 opened to reveal the interior of the enclosure, described in more detail below. This embodiment also illustrates use of a polymer composite ring 32 positioned on a top edge of the enclosure's vertical side wall structure. In this embodiment the cover plate 30 rests on the polymer composite ring during use. This embodiment also illustrates use of the cover plate 30 made of a polymer concrete material. The body of the enclosure is made from a non-metal, non-concrete, molded thermoplastic polymeric material such as high density polyethylene. Other thermoplastic materials comprised of polyolefin materials in general also can be used.

Figure 2:
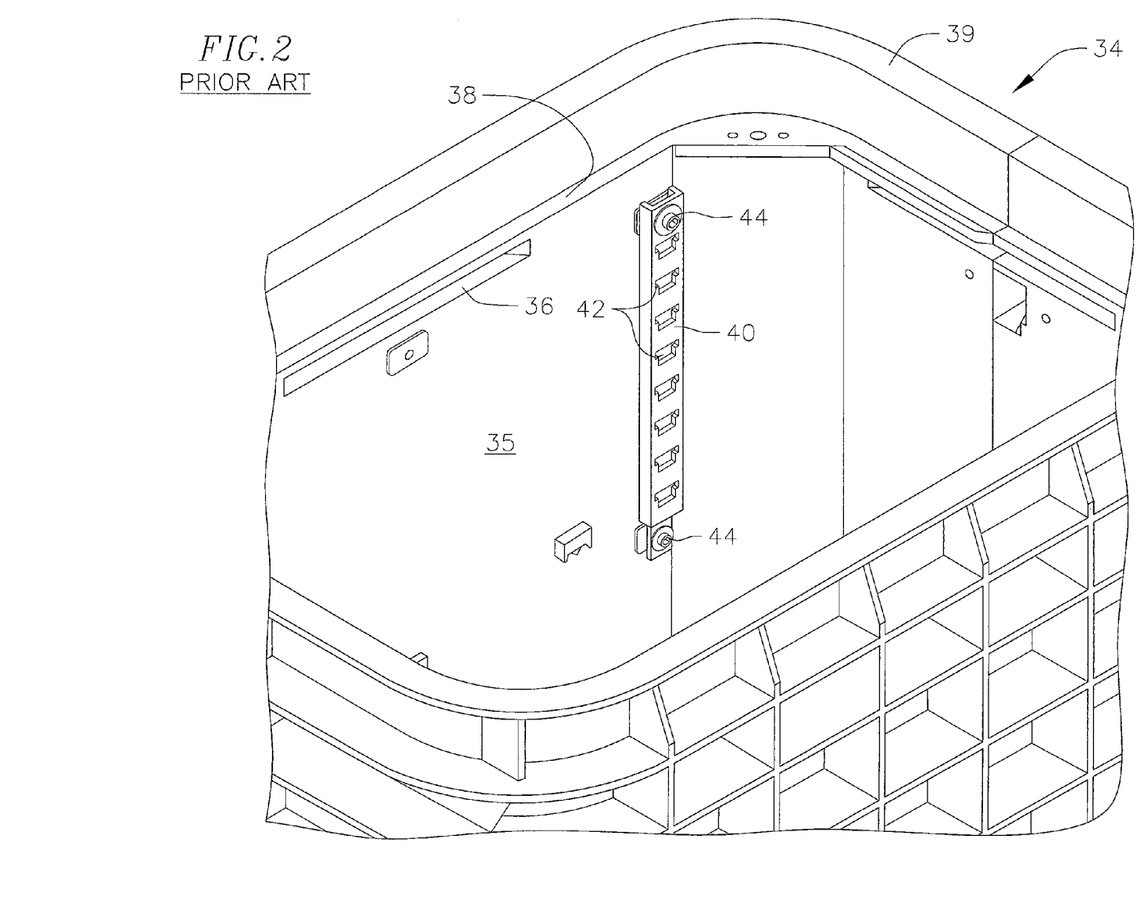
FIG. 2 is an enlarged fragmentary perspective view showing the construction of a prior art grade level utilities enclosure.
Figure 3:
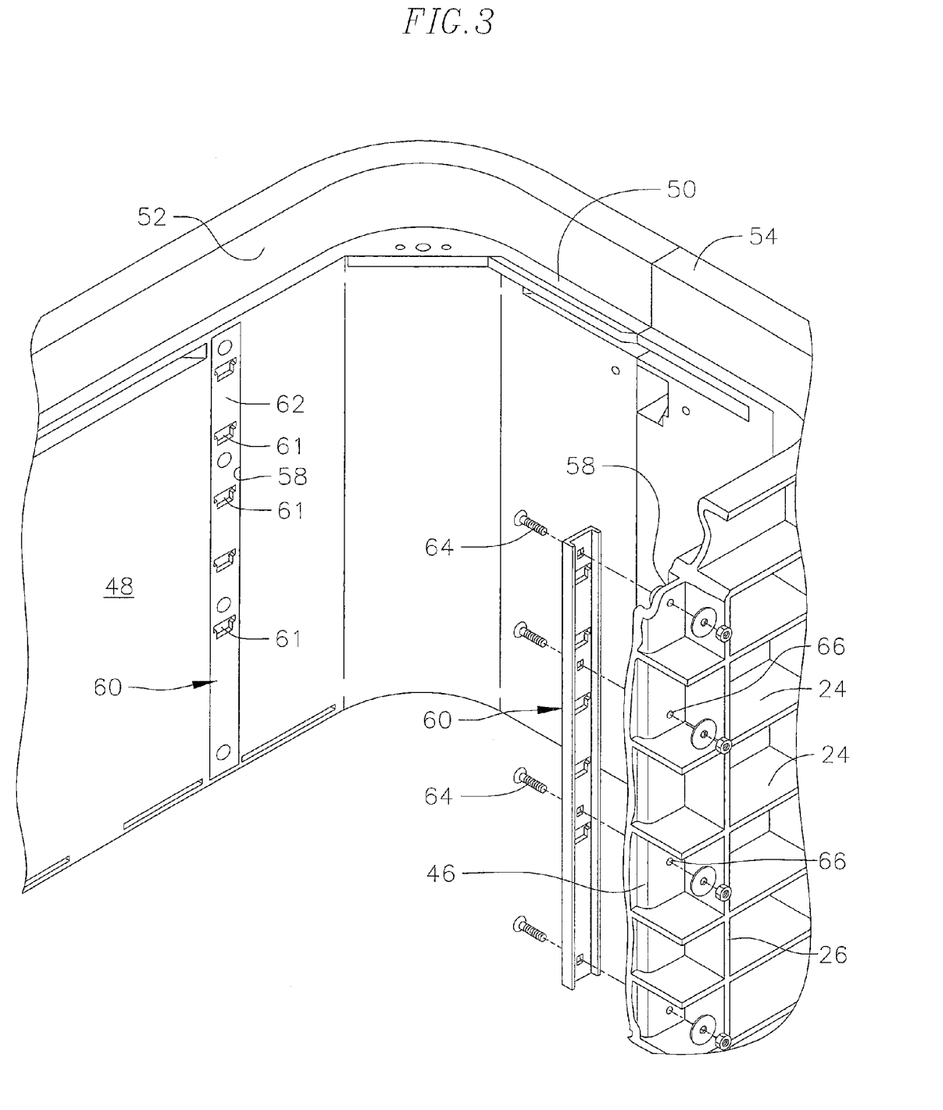
FIG. 3 is an enlarged fragmentary perspective view showing the detailed construction of the enhanced strength grade level utilities enclosure according to principles of this invention.

FIGS. 2 and 3 illustrate a comparison between the present invention (FIG. 3) and a prior art grade level utilities enclosure (FIG. 2).

The FIG. 2 illustration shows the prior art enclosure 34 having a vertical wall structure with a flat inside vertical wall surface 35. This embodiment shows narrow elongated recessed slots 36 extending parallel to the top edge of the box. These slots are formed below an inside peripheral rim 38 which extends around and somewhat below a top edge 39 of the enclosure. The slots can be used for interlocking with a cover plate locking device when a cover plate is positioned atop the enclosure. This prior art embodiment also shows a typical prior art use of a narrow, elongated metal cable rack 40 affixed to the flat inside wall surface 35 of the enclosure. The cable rack, as is well known in the art, includes a series of vertically spaced apart stepped connectors 42 for use in attaching various types of equipment used in the interior of the enclosure. The top and bottom of the cable rack are affixed to the side wall of the enclosure by suitable fasteners 44.

The enclosure of this invention, as shown in FIG. 1A, includes two cable racks 60 on each side, described below, and a hanger bar 33 that provides an organizer feature for internal equipment. The hanger bar is attached to the enclosure at its ends without fasteners.

FIG. 3 illustrates a more detailed construction of the underground enclosure 10 which is open at its top and reveals the interior of the enclosure. The vertical wall structure of the enclosure is formed by having integrally molded a vertical inner wall panel 46 with the exterior grid structure (formed by the horizontal and vertical flanges 24 and 26). The vertical inner wall has a flat inside surface 48 that extends continuously around and faces toward the open interior of the enclosure.

The FIG. 3 illustration also shows a narrow horizontal annular rim 50 that extends around the upper inside portion of the enclosure. The rim extends inwardly around and below a short vertical wall 52 that spans an upper portion of the enclosure. An annular outer flange 54 above the shortened wall 52 forms the top edge of the enclosure.

According to the present invention, the vertical wall structure's load strength is enhanced by a system of substantially vertically extending rigid support bars inserted into corresponding narrow, elongated recessed regions or pockets 58 molded into the otherwise flat inside surface 48 of the vertical inside wall panel 46. The rigid support bars are preferably formed as cable racks 60 adapted for supporting various types of internal equipment used in the enclosure, via a stepped series of vertically spaced apart connectors 61 on the base of each cable rack. Each cable rack is generally U-shaped or channel-shaped in cross sectional configuration, having a flat base 62 flush with the enclosure's inside surface 48 when the bar is positioned in the recessed slotted region. The side walls of the channel-shaped cable racks rigidly engage the bottoms of the recessed pockets 58 in which they are positioned. The cable rack is rigidly affixed to the recessed regions by a series of vertically spaced apart fasteners 64 (and corresponding threaded nuts and washers) screwed into corresponding holes 66 in the wall of the enclosure. The cable racks are preferably made from galvanized steel or stainless steel, although they can be made from hard plastic or fiberglass. In one embodiment the metal cable racks have a depth of about 9/16 inch, a width of about 1½ inches, and a thickness of about ⅛ inch.

Figures 4, 6:
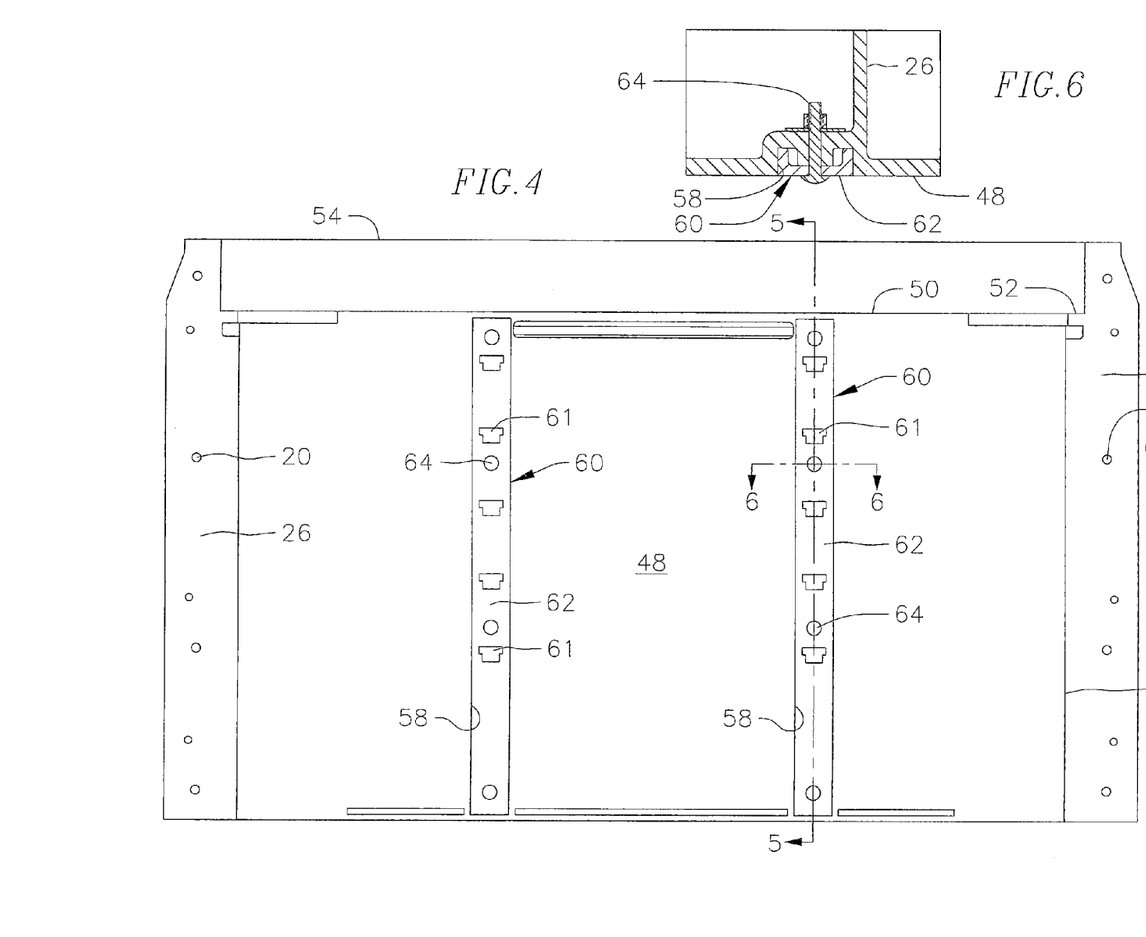
FIG. 4 is a front elevational view, partly in cross section, showing an inside wall of the enhanced strength enclosure.
FIG. 6 is a cross sectional view taken on line 6-6 of FIG. 4
Figure 5:
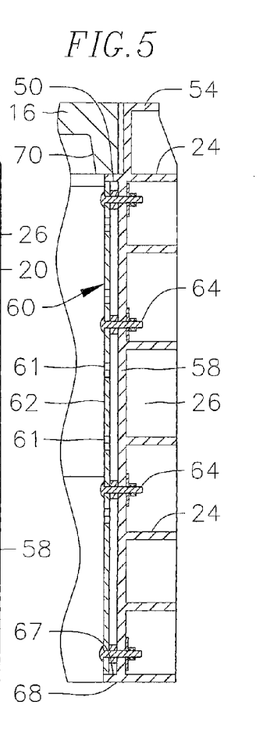
FIG. 5 is a cross sectional view taken on line 5-5 of FIG. 4.

FIGS. 4 to 6 illustrate in more detail the structural configuration of the enhanced strength enclosure provided by the invention. Preferably, two cable racks 60 are positioned on each longitudinal side wall of the enclosure, although more cable racks could be positioned on each side of the enclosure. FIG. 4 shows a pair of longitudinally spaced apart cable racks 60 rigidly secured to corresponding slotted recessed regions 58 on one side of the enclosure. There are two cable racks similarly positioned on the opposite side wall of the enclosure. Similar cable racks, or other means of rigid vertical support can be affixed to similar recessed regions or pockets in the end walls of the enclosure.

In use, the cable racks 60 provide a substantially continuous means of rigid vertical support extending from the top to the bottom of the enclosure's outer wall. The wall of the enclosure has an annular bottom edge 68 on which the enclosure is supported when the enclosure rests on the ground. The bottom edge is formed as an inverted T-shaped structure, integral with the side wall structure of the enclosure. The bottom edge has an integrally formed inner lip 67 facing the interior of the enclosure, near its bottom. The bottom edges of the cable racks 60 rest on the flanged inner lip 67 of the enclosure side wall. The top edges of the cable racks are engaged with a bottom edge of the annular upper rim 50 that faces the interior of the enclosure. When the cover plate 16 is positioned in the top of the enclosure an annual lower rim 70 of the cover plate rests on the annular rim 50, and a downward force on the cover plate is resisted by the substantially vertically-positioned enclosure side walls reinforced by the substantially vertically-positioned rigid cable racks 60.

The grade level enclosure of this invention was tested for its load integrity according to standards used for such enclosures in the telecommunications industry.

These test standards can vary as to load levels, resistance to deflection, and other test parameters. Such test standards also can very between U.S. and European, for example. One set of these test standards used for testing load integrity of the invention is identified as the ANSI/SCTE 77 2010 Specification for Underground Enclosure Integrity, incorporated herein by this reference. The enclosure under test consisted of the enclosure illustrated in FIGS. 1 and 3-6. The vertical load capacity of this test unit was compared with the same enclosure, but with the four cable racks removed from the recessed slotted regions of the enclosure. The ANSI Tier 15 test methods were used, as one example, to determine the enclosure's vertical load capacity in both instances: The vertical load capacity of the enclosure was tested for side wall load capacity and center load body deflection, using vertical side wall test and cover plate test methods for ANSI Tier 15.

Figure 7:
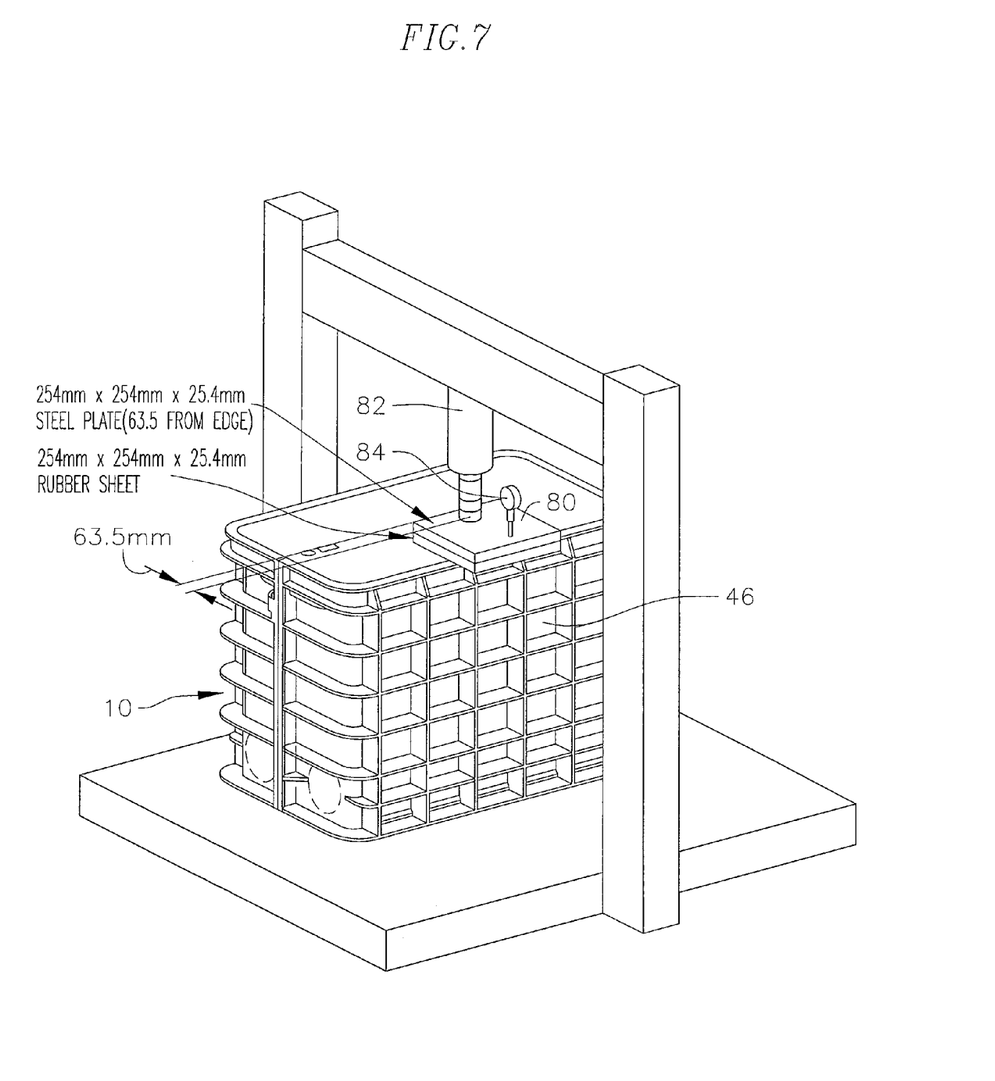
FIG. 7 is a schematic perspective view showing a test set up for a side wall load test according to ANSI/SCTE 77-2010 Tier 15.

FIG. 7 illustrates the test set up used for the Tier 15 vertical side wall test. This test shows the load plate 80 and load ram 82 positioned over and applying a downward load to the vertical side wall 46 of the enclosure 10. This view also shows a dial indicator 84 of a sensor for measuring deflection. In this test, deflection measuring devices are positioned to indicate vertical and lateral deflection wherever maximum deflection occurs. Design load is cycled 10 times, followed by applying the test load.

Figure 8:
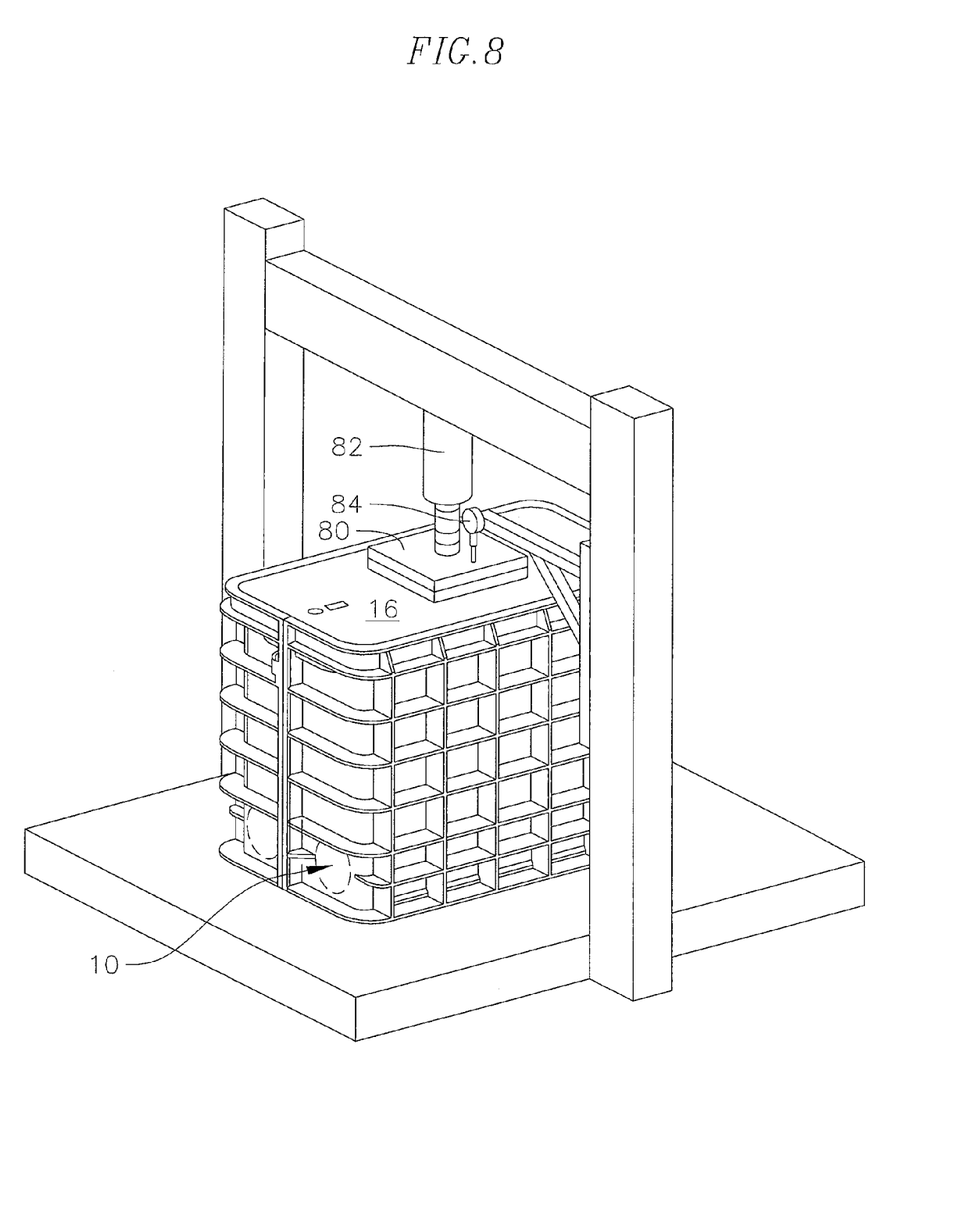
FIG. 8 is a schematic perspective view showing a test set up for a Tier 15 center load test.

FIG. 8 illustrates the test set up used for the Tier 15 cover plate center load test. In this test set up the load plate 80 applies a downward force to the cover plate 16.

Figure 9:
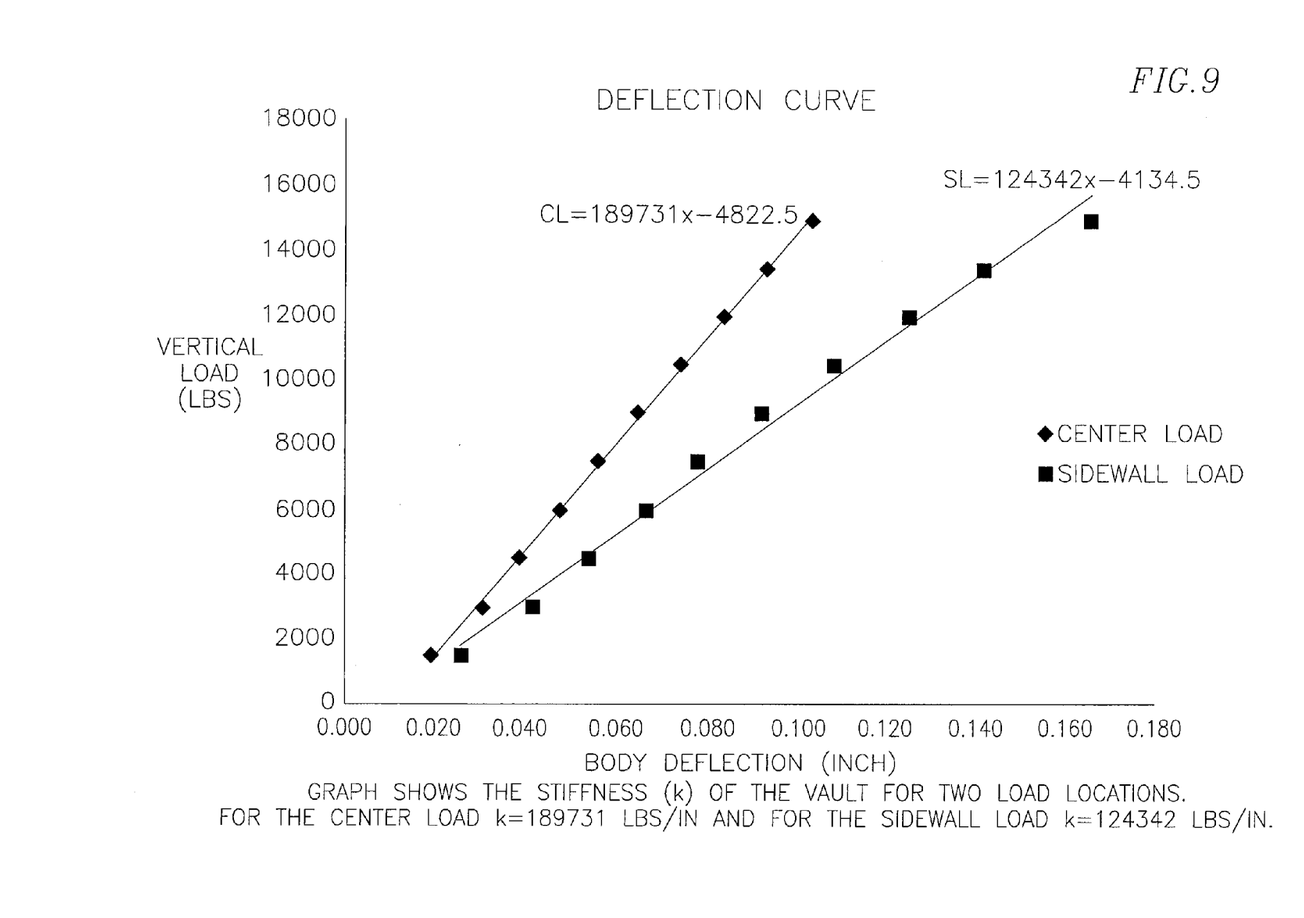
FIG. 9 shows comparative deflection curves for tests conducted on the present invention.
Figure 10:
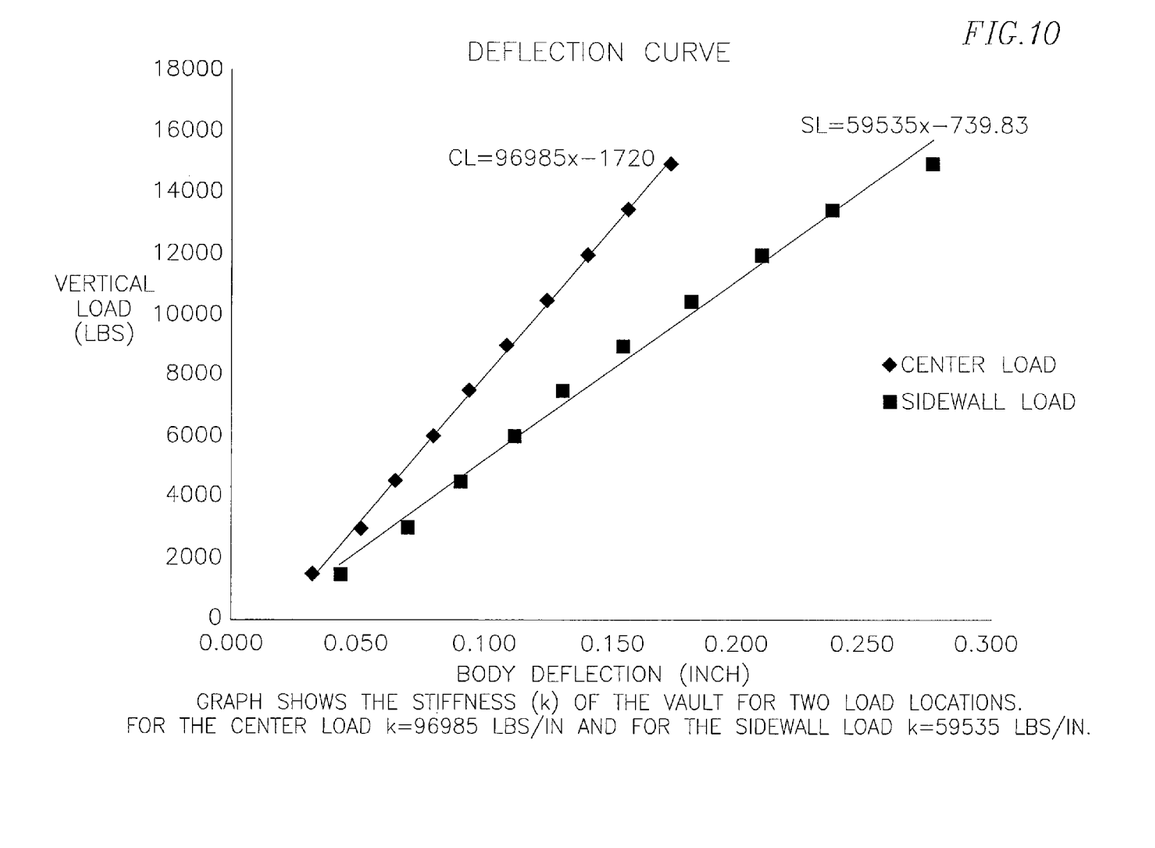
FIG. 10 shows comparative deflection curves for tests conducted on a modified utilities enclosure.
Figure 11:
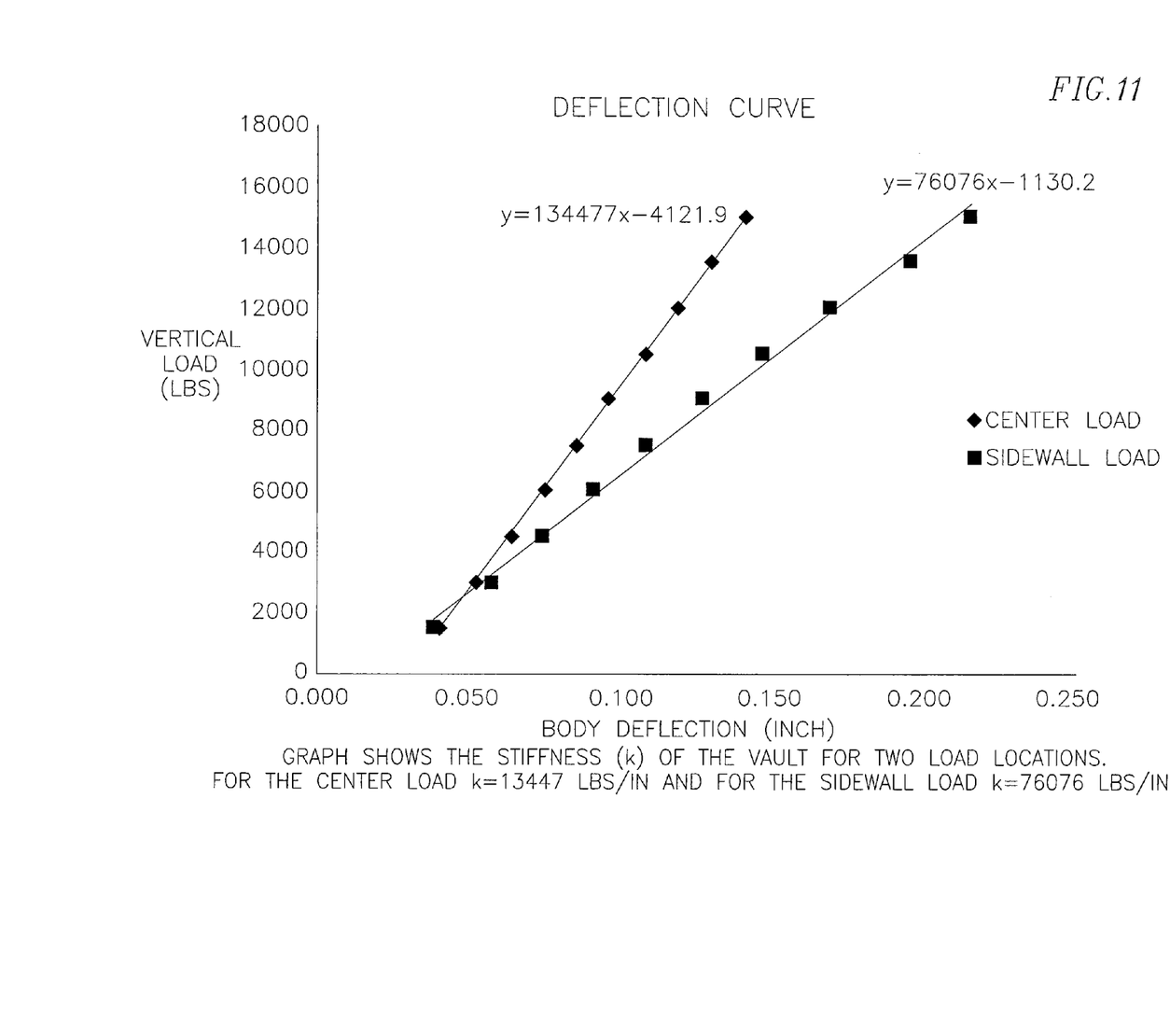
FIG. 11 shows comparative deflection curves for tests conducted on a prior art utilities enclosure.

Tier 15 test results are shown in the following example and are illustrated comparatively by the deflection curves shown in FIGS. 9, 10 and 11.

EXAMPLE

1. Purpose
    Test the strength of the modified enclosure of this invention with the metal cable rack inserts and compare those test results with a modified vault without the metal cable rack inserts.
    Compare those test results with similar tests conducted on a non-modified prior art enclosure as shown in FIG. 2.
2. Test Material
    Dake mechanical test frame (Frame, 50K load cell)
    Aerospace digital indicator gauge
    Omega Model DP41-B digital read out
    10 in (254 mm)×10 in (254 mm)×1 in (25 mm) thick steel loading plate backed with ½ in (13 mm) thick rubber, per SCTE 77 Tier 15
    One sample with two metal cable racks installed in each long side (four racks total) or three per side (6 racks total) for the non-modified prior art vault
    One sample without racks installed
3. Test Procedure
    Center Load Test
    1. Attach 10 in×10 in (254 mm×254 mm) loading plate to Dake test frame
    2. Place the enclosure on test frame
    3. Place standard L-bolt PC lid in the enclosure
    4. Locate and align center of lid with center of loading plates. See FIG. 8
    5. Attach indicator gauge to test frame and located in on the top surface of the enclosure in the middle of the long side
    6. Turn on hydraulics
    7. Apply load of 15000 lbs and take displacement reading
    8. Remove load and take permanent displacement reading
    9. Repeat Steps 7 and 8 for a total of 10 cycles
    10. Apply proof load of 22,500 lbs and hold for 30 seconds
    11. Release the load and visually inspect sample for any cracks, collapse, or other structural failures
    Side Wall Load Test
    1. Move load plate so that it is attached using the side wall configuration
    2. Locate and align the test plate center with the middle of the long side of the lid and Where the lid and vault come together on the side. See FIG. 7
    3. Attach indicator gauge to test frame and located in on the top surface of the enclosure as close to the middle of the long side
    4. Repeat Steps 6 to 11 above
    5. If vault has not failed then take it to failure using the side wall load test
4. Observations
    All three vault configurations tested very well during the center load test. After the center load test there were no observed effects on either vault.
    The big difference between the two modified configurations was when the side wall load test was performed. When the vault with the racks installed was loaded there were no observable effects. One could not tell load was being applied. When the vault without racks was loaded it started to collapse while holding the proof load of 22500 lbs.
    During the side wall load the non-modified prior art vault passed Tier 15 test with slight deformation observed. The vault was taken to failure, which occurred at 24,00 lbs when a crack was observed at the intersection of the rib pattern.
    Because the vault with racks did not fail during the Tier 15 test, it was taken to failure which still did not happen because the PC (polymer concrete) lid broke at 32,000 lbs.
5. Conclusions
    The vault of this invention withstands the 22,500 lbs test load requirement of Tier 15, and produces a minimum vertical side wall load capacity in excess of 25,000 lbs. The vertical side load capacity is enhanced sufficiently to also meet load capacity standards in excess of at least 30,000 lbs. Side load stiffness k is in excess of 100,000 lbs/in and center load stiffness k is in excess of 150,000 lbs/in. The side load stiffness k is sufficiently enhanced to meet standards in excess of at least 80,000 lbs/in.

More specifically, according to the comparative test results, vertical side wall load capacity, measured as a function of side wall deflection, met Tier 15 requirements with a vault body composition comprised of a non-metal, non-concrete, non-fiberglass thermoplastic material. The vault with racks had a stiffness of k=189731 lbs/in and k=124342 lbs/in for the center load and side wall load tests, respectively. The vault without racks had a stiffness of k=96985 lbs/in and k=59535 lbs/in for the center load and side wall load tests respectively, The vault with racks was stiffer by 96% and 109% on the center load and side wall load tests, respectively. The prior art non-modified vault with cable racks had a stiffness k=134,477 lbs/in and k=76,076 lbs/in for the center and side wall load tests. The present invention's vault with cable racks was stiffer by 41% and 63% on the center load and side wall load tests, respectively, than the prior art non-modified vault.

Test Results:

| LOAD CYCLE | Load Applied (lbs) | Center load Body Deflection (inch) | Center load Permanent Deflection (inch) | Side wall Load Body Deflection (inch) | Side wall Load Permanent Deflection (inch) |
|---|---|---|---|---|---|
| Sample Description $\delta_{max} = 0.5"$ $\delta_{set} = NA$ | | | | | |
| Vault with Cable Racks and Rack Pockets, Standard Drop in Lid | | | | | |
| 10% | 1500 | 0.030 | | 0.039 | |
| 20% | 3000 | 0.042 | | 0.059 | |
| 30% | 4500 | 0.050 | | 0.076 | |
| 40% | 6000 | 0.059 | | 0.087 | |
| 50% | 7500 | 0.066 | | 0.094 | |
| 60% | 9000 | 0.074 | | 0.104 | |
| 70% | 10500 | 0.081 | | 0.114 | |
| 80% | 12000 | 0.088 | | 0.127 | |
| 90% | 13500 | 0.096 | | 0.140 | |
| Cycle 1 | 15000 | 0.103 | 0.020 | 0.156 | 0.026 |
| Cycle 2 | 15000 | 0.103 | 0.020 | 0.154 | 0.029 |
| Cycle 3 | 15000 | 0.103 | 0.020 | 0.153 | 0.030 |
| Cycle 4 | 15000 | 0.103 | 0.020 | 0.154 | 0.033 |
| Cycle 5 | 15000 | 0.103 | 0.021 | 0.154 | 0.035 |
| Cycle 6 | 15000 | 0.104 | 0.021 | 0.156 | 0.034 |
| Cycle 7 | 15000 | 0.104 | 0.021 | 0.158 | 0.034 |
| Cycle 8 | 15000 | 0.103 | 0.022 | 0.157 | 0.033 |
| Cycle 9 | 15000 | 0.105 | 0.022 | 0.157 | 0.038 |
| Cycle 10 | 15000 | 0.104 | 0.022 | 0.157 | 0.036 |
| Final Cover Load | 22500 | 0.143 | | 0.235 | |
| Failure Load | 32000 lbs (PC Lid failed, not the vault) | | | | |
| Vault with Rack Pockets, but without Racks, Standard Drop in Lid | | | | | |
| 10% | 1500 | 0.032 | | 0.043 | |
| 20% | 3000 | 0.051 | | 0.070 | |
| 30% | 4500 | 0.065 | | 0.091 | |
| 40% | 6000 | 0.080 | | 0.112 | |
| 50% | 7500 | 0.094 | | 0.131 | |
| 60% | 9000 | 0.109 | | 0.155 | |
| 70% | 10500 | 0.125 | | 0.182 | |
| 80% | 12000 | 0.141 | | 0.210 | |
| 90% | 13500 | 0.157 | | 0.238 | |
| Cycle 1 | 15000 | 0.174 | 0.041 | 0.278 | 0.062 |
| Cycle 2 | 15000 | 0.167 | 0.041 | 0.266 | 0.072 |
| Cycle 3 | 15000 | 0.172 | 0.041 | 0.265 | 0.074 |
| Cycle 4 | 15000 | 0.168 | 0.043 | 0.267 | 0.072 |
| Cycle 5 | 15000 | 0.171 | 0.043 | 0.266 | 0.072 |
| Cycle 6 | 15000 | 0.172 | 0.046 | 0.267 | 0.076 |
| Cycle 7 | 15000 | 0.168 | 0.045 | 0.270 | 0.079 |
| Cycle 8 | 15000 | 0.171 | 0.046 | 0.272 | 0.079 |
| Cycle 9 | 15000 | 0.173 | 0.047 | 0.273 | 0.081 |
| Cycle 10 | 15000 | 0.169 | 0.045 | 0.272 | 0.083 |
| Final Cover Load | 22500 | 0.279 | 0.075 | 0.455 | 0.137 |
| Failure Load | 22500 lbs | | | | |
| Prior Art Vault w/o Molded in Rack Slots. Vault Fitted with Three Racks per Side. Standard Lid | | | | | |
| 10% | 1500 | 0.041 | | 0.039 | |
| 20% | 3000 | 0.053 | | 0.058 | |
| 30% | 4500 | 0.065 | | 0.075 | |
| 40% | 6000 | 0.076 | | 0.092 | |
| 50% | 7500 | 0.086 | | 0.109 | |
| 60% | 9000 | 0.097 | | 0.128 | |
| 70% | 10500 | 0.109 | | 0.148 | |
| 80% | 12000 | 0.120 | | 0.170 | |
| 90% | 13500 | 0.131 | | 0.197 | |
| Cycle 1 | 15000 | 0.142 | 0.021 | 0.217 | 0.038 |
| Cycle 2 | 15000 | 0.137 | 0.020 | 0.203 | 0.033 |
| Cycle 3 | 15000 | 0.135 | 0.020 | 0.206 | 0.033 |
| Cycle 4 | 15000 | 0.135 | 0.020 | 0.201 | 0.032 |
| Cycle 5 | 15000 | 0.134 | 0.020 | 0.197 | 0.030 |
| Cycle 6 | 15000 | 0.134 | 0.020 | 0.208 | 0.036 |
| Cycle 7 | 15000 | 0.136 | 0.022 | 0.203 | 0.035 |
| Cycle 8 | 15000 | 0.135 | 0.022 | 0.202 | 0.035 |
| Cycle 9 | 15000 | 0.136 | 0.022 | 0.203 | 0.035 |

-continued

Sample Description
$\delta_{max} = 0.5"$
$\delta_{set} = NA$

| LOAD CYCLE | Load Applied (lbs) | Center load Body Deflection (inch) | Center load Permanent Deflection (inch) | Side wall Load Body Deflection (inch) | Side wall Load Permanent Deflection (inch) |
|---|---|---|---|---|---|
| Cycle 10 | 15000 | 0.133 | 0.021 | 0.206 | 0.037 |
| Final Cover Load | 22500 | 0.185 | 0.048 | 0.335 | 0.108 |
| Failure Load | | | 24000 lbs | | |

The tests conducted on the present invention have demonstrated improvements in vertical side load capacity, as one example, for molded polymeric grade level enclosures, or other non-metal structures, such as fiberglass. The ANSI Tier 15 test results are also one example demonstrating the improvements in vertical side wall load capacity. Other test standards also can be used to measure the level of improvements provided by the invention. As one example, similar comparative tests conducted on similar structures, but having different vertical side wall requirements, would see an improvement in load capacities when utilizing the structural combination of this invention.

What is claimed is:

1. An enhanced strength grade level utility enclosure for underground utilities connections, comprising:
   a substantially vertical wall structure extending continuously around an open interior region within the wall structure, the wall structure made of a molded polymeric material;
   the vertical wall structure having an upper edge extending around an opening to the interior of the enclosure and a bottom edge on which the enclosure is supported;
   a removable cover plate adapted for mounting to the opening in the grade level enclosure to close off at least a portion of the interior region from the environment, the cover plate adapted to engage at least a portion of the enclosure's upper edge structure;
   the vertical wall structure including an upright inner wall panel extending from the upper edge to the bottom edge of the vertical wall structure, the inner wall panel having an upright inside face spanning the interior of the enclosure;
   the inside face of the inner wall panel having left and right sides opposing one another;
   one or more narrow, vertical slotted regions recessed in the inside face of the inner wall panel on the left side and on the right side of the enclosure extending from the upper edge to the bottom edge of the inner wall panel; and
   an upright rigid support bar adapted for use as a cable rack positioned in at least one slotted region on each side of the wall structure's inside face;
   the support bars having a flat continuous face flush with the inside face of the inner wall panel defining a cavity within the slotted region behind the flat continuous face, the support bars providing substantially continuous rigid vertical support extending from the upper edge to the bottom edge of the enclosure's vertical wall structure.

2. Apparatus according to claim 1 in which the recessed support bars provide enhanced wall strength for the vertical wall structure sufficient for meeting ANSI/SCTE 77-2010 Tier 15 vertical side wall load test standards.

3. Apparatus according to claim 1 including a vertically and horizontally extending exterior supporting grid structure made of a molded polymeric material integrally molded to the inside face of the vertical wall structure, the grid structure comprising horizontally spaced apart vertical ribs extending continuously from a lower to an upper portion of the vertical wall structure, and vertically spaced apart horizontal ribs extending continuously around the vertical wall structure; and in which the inner wall panel is molded to the grid structure.

4. Apparatus according to claim 1 in which the recessed support bars provide enhanced wall strength sufficient for meeting the ANSI Tier 15 vertical side wall load and center cover load test standards.

5. Apparatus according to claim 1 in which the vertical wall structure is made from at least one of (a)-(c): (a) high density polyethylene; (b) a thermoplastic material; (c) a polyolefin material.

6. Apparatus according to claim 1 in which the cover plate is made from a polymer/concrete material.

7. Apparatus according to claim 1 in which the rigid support bar has a U-shaped cross sectional configuration with the flat continuous face of the bar facing toward the interior of the enclosure, including spaced apart fasteners rigidly affixing each support bar through the cavity to the recessed slotted region, and in which the support bars include stepped connectors extending through the flat continuous face for attachment to equipment disposed within the interior of the enclosure.

8. Apparatus according to claim 1 including underground telecommunications equipment attached to vertically spaced apart connectors on the support bar.

9. Apparatus according to claim 1 in which the vertical side wall load capacity is in excess of 25,000 lbs.

10. Apparatus according to claim 1 in which the wall structure of the enclosure body comprises a substantially non-metal, non-concrete, non-fiberglass thermoplastic material.

11. An enhanced strength grade level utility enclosure for underground utilities connections, comprising:
   a substantially vertical wall structure extending continuously around an open interior region within the wall structure, the wall structure having an open bottom and made of a molded polymeric material;
   the vertical wall structure having an upper edge extending around an opening to the interior of the enclosure and a bottom edge on which the enclosure is supported;
   the vertical wall structure including an upright inner wall panel extending from the upper edge to the bottom edge of the vertical wall structure, the inner wall panel having an upright inside face spanning the interior of the enclosure;

the inside face of the inner wall panel having left and right sides opposing one another;

longitudinally spaced apart, vertical slotted regions recessed in the inside face of the inner wall panel on the left side and on the right side of the enclosure extending from the upper edge to the bottom edge of the inner wall panel; and an upright rigid support bar adapted for positioning in separate vertical slotted regions on each side of the wall structure's inside face;

in which positioning of the support bars in the vertical slotted regions having a flat continuous face flush with the inside face of the inner wall panel defining a cavity within the vertical slotted regions behind the flat continuous face, the support bars provide substantially continuous rigid vertical support extending from the upper edge to the bottom edge of the enclosure's vertical wall structure.

12. Apparatus according to claim 11 in which the recessed support bars provide enhanced wall strength for the vertical wall structure sufficient for meeting ANSI/SCTE 77-2010 Tier 15 vertical side wall load test standards.

13. Apparatus according to claim 11 including a vertically and horizontally extending exterior supporting grid structure made of a molded polymeric material integrally molded to the inside face of the vertical wall structure, the grid structure comprising horizontally spaced apart vertical ribs extending continuously from a lower to an upper portion of the vertical wall structure, and vertically spaced apart horizontal ribs extending continuously around the vertical wall structure; and in which the inner wall panel is molded to the grid structure.

14. Apparatus according to claim 11 in which the recessed support bars provide enhanced wall strength with a side load stiffness in excess of 100,000 lbs/in.

15. Apparatus according to claim 11 in which the enclosure includes at least two of the rigid support bars on each side of the enclosure.

16. Apparatus according to claim 12 in which the vertical wall structure of the enclosure is made from at least one of (a)-(c): (a) high density polyethylene; (b) a thermoplastic material; (c) a polyolefin material.

17. Apparatus according to claim 12 in which the rigid support bar has a U-shaped cross sectional configuration with the flat continuous face of the bar facing toward the interior of the enclosure, including fasteners adapted for rigidly affixing the support bars through the cavity to the recessed slotted regions.

18. Apparatus according to claim 17 in which the support bars comprise cable racks having stepped connectors extending through the flat continuous face for attachment to equipment disposed within the interior of the enclosure.

19. Apparatus according to claim 12 in which the vertical side wall load capacity is in excess of 25,000 lbs.

20. Apparatus according to claim 12 in which the enclosure's center load body deflection meets the ANSI Tier 15 test requirements.

* * * * *